United States Patent Office.

EDGAR M. STEVENS, OF CHELSEA, MASSACHUSETTS, ASSIGNOR TO HIMSELF AND W. N. ELY, TRUSTEES.

*Letters Patent No. 76,265, dated March 31, 1868.*

COMPOUND RUBBER-ENAMELLED CLOTH FOR BOOTS AND SHOES.

The Schedule referred to in these Letters Patent and making part of the same.

Be it known that I, EDGAR M. STEVENS, of Chelsea, Massachusetts, have invented a new Improvement in the Manufacture of Boots and Shoes, of which the following is a full description.

The nature of my invention consists in using the common ordinary enamelled cloth of commerce, with a percentage of plastic rubber mixed with the ordinary ingredients used in preparing such cloth, for making boots and shoes.

Rubber cloth has been used in various ways for boots and shoes, and also enamelled cloth. Cloth has been coated with rubber and enamelled, and cloth has been water-proofed in various ways, by using different processes and preparations, in which rubber formed an ingredient. But the ordinary American enamelled cloth, made and sold under that name, and used for carriage-tops and cushion-coverings, does not contain any rubber. This cloth is liable to be affected by the temperature, and to crack with cold and use. The ingredients used in preparing this cloth are mainly litharge and boiled oil, the object being to furnish a somewhat substantial body of matter upon the cloth; but these lack the pliability and toughness which are imparted by the admixture and use of a percentage of rubber.

To the ordinary ingredients used in preparing the ordinary enamelled cloth of commerce, I add umber, and mix a percentage of plastic rubber, rubber cement, or rubber dissolved in any of the well-known ways, of from five to twenty-five per cent., according to the purposes for which it is to be used. This will furnish a compound rubber-enamel cloth more pliable, more tenacious, and less liable to crack or to be affected by changes of temperature, and so more reliably water-proof. It may be used for uppers wholly, or in part only, as desired.

The particular ingredients used by me are, boiled linseed-oil, litharge, burnt umber, and plastic or dissolved rubber, each one part. But, while I use these ingredients, I do not wish to confine myself to the precise proportions named. They may be varied according to the thickness and quality of the stock and the cloth required.

What I claim, is—

1. The use of the compound rubber-enamel cloth, as described, in the manufacture of boots and shoes.

2. As articles of manufacture, boots and shoes made, as to their uppers, of the compound rubber-enamel cloth, substantially as described.

Witness my hand to the foregoing specification.

E. M. STEVENS.

Witnesses:
E. F. SHAW,
W. M. PARKER.